United States Patent
Li et al.

(10) Patent No.: US 7,411,634 B2
(45) Date of Patent: Aug. 12, 2008

(54) LCD TV AND PROJECTION-BASED BACKLIGHT SYSTEM USED THEREFOR

(75) Inventors: Kuo Yuin Li, Tainan County (TW); Yen Chen Chen, Tainan County (TW)

(73) Assignee: Himax Technologies, Inc., Tainan County (TW)

( * ) Notice: Subject to any disclaimer, the term of this patent is extended or adjusted under 35 U.S.C. 154(b) by 0 days.

(21) Appl. No.: 11/872,560

(22) Filed: Oct. 15, 2007

(65) Prior Publication Data

US 2008/0036928 A1 Feb. 14, 2008

Related U.S. Application Data

(62) Division of application No. 10/813,064, filed on Mar. 31, 2004, now Pat. No. 7,301,586.

(51) Int. Cl.
*G02F 1/1335* (2006.01)
(52) U.S. Cl. .............................. 349/5; 349/9
(58) Field of Classification Search ............ 349/5, 349/9
See application file for complete search history.

(56) References Cited

U.S. PATENT DOCUMENTS

| | | |
|---|---|---|
| 5,597,222 A | 1/1997 | Doany et al. |
| 5,963,276 A | 10/1999 | Inbar |
| 6,000,802 A | 12/1999 | Hashizume et al. |
| 6,149,276 A | 11/2000 | Takeuchi et al. |
| 6,201,645 B1 | 3/2001 | Ohuchi et al. |
| 6,520,645 B2 | 2/2003 | Yamamoto et al. |
| 6,559,901 B2 | 5/2003 | Yamamoto et al. |
| 6,676,260 B2 | 1/2004 | Cobb et al. |
| 6,866,404 B2 | 3/2005 | Yamauchi et al. |
| 6,894,840 B2 | 5/2005 | Yamanaka et al. |
| 6,992,832 B2 | 1/2006 | Yamanaka et al. |
| 7,002,553 B2 | 2/2006 | Shkolnikov |
| 7,048,385 B2 * | 5/2006 | Beeson et al. ............... 353/97 |
| 2004/0114235 A1 * | 6/2004 | Sedlmayr ................... 359/485 |
| 2005/0073652 A1 * | 4/2005 | Yatsu et al. ................. 353/20 |

* cited by examiner

*Primary Examiner*—David C. Nelms
*Assistant Examiner*—David Y Chung

(57) ABSTRACT

An LCD TV includes a housing, an LCD screen panel disposed on the front side of the housing, a first mirror disposed on the back side of the housing and a projection-based backlight system disposed in a lower cabinet of the housing, wherein the projection-based backlight system provides polarized light for the LCD screen panel through the first mirror. The projection-based backlight system can provide uniformly polarized light and increase polarization efficiency as well as be easily achieved by using low-cost optical components.

4 Claims, 4 Drawing Sheets

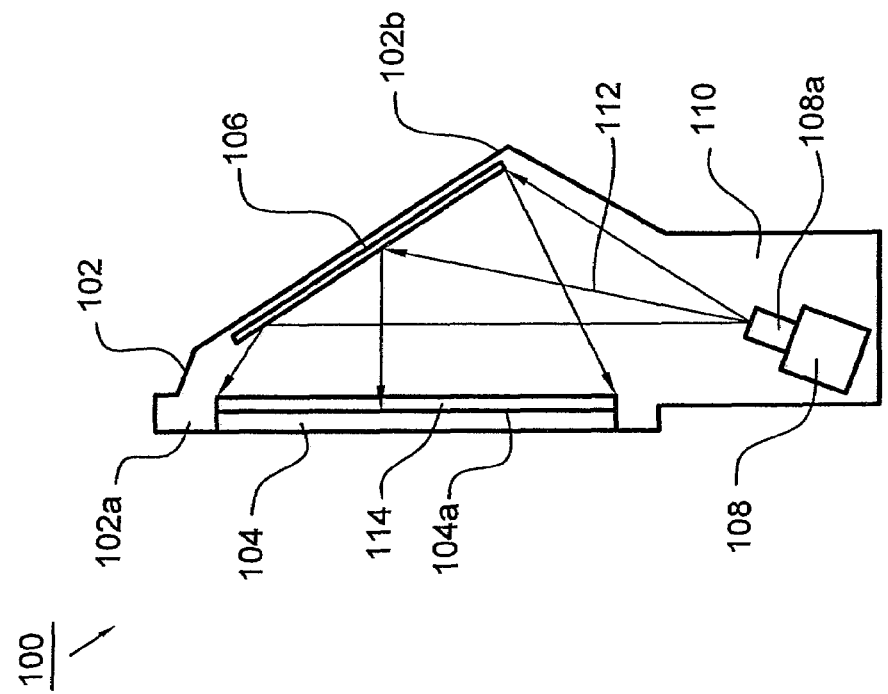
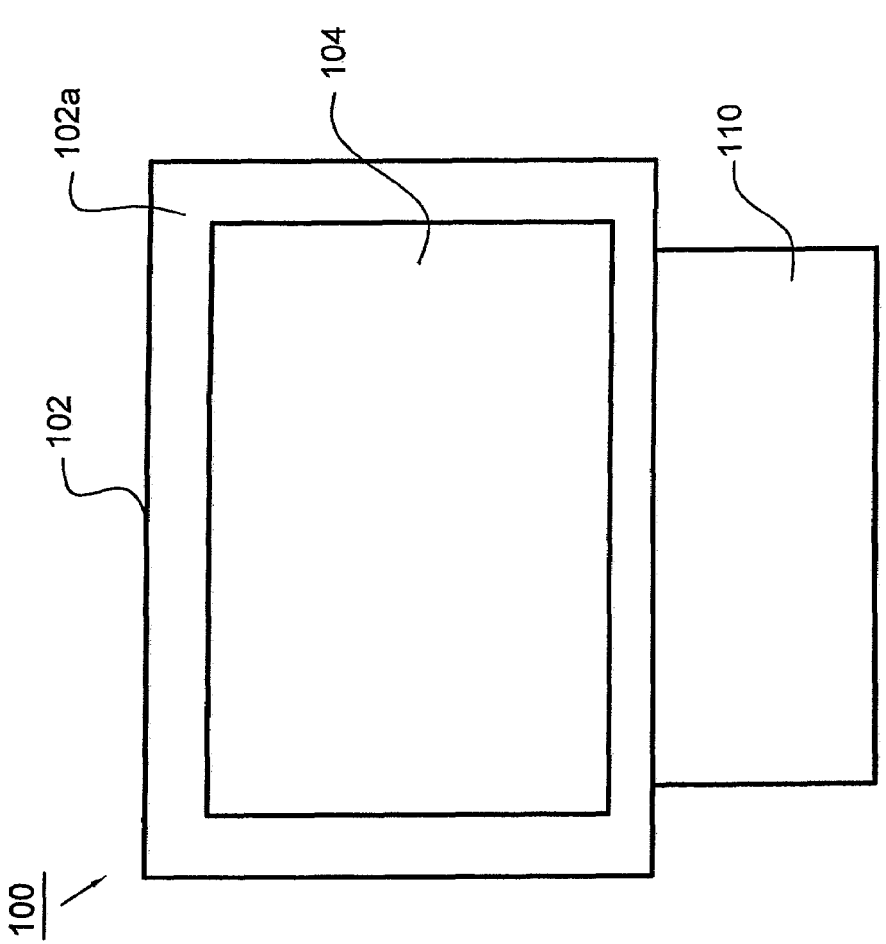
FIG. 1b
FIG. 1a

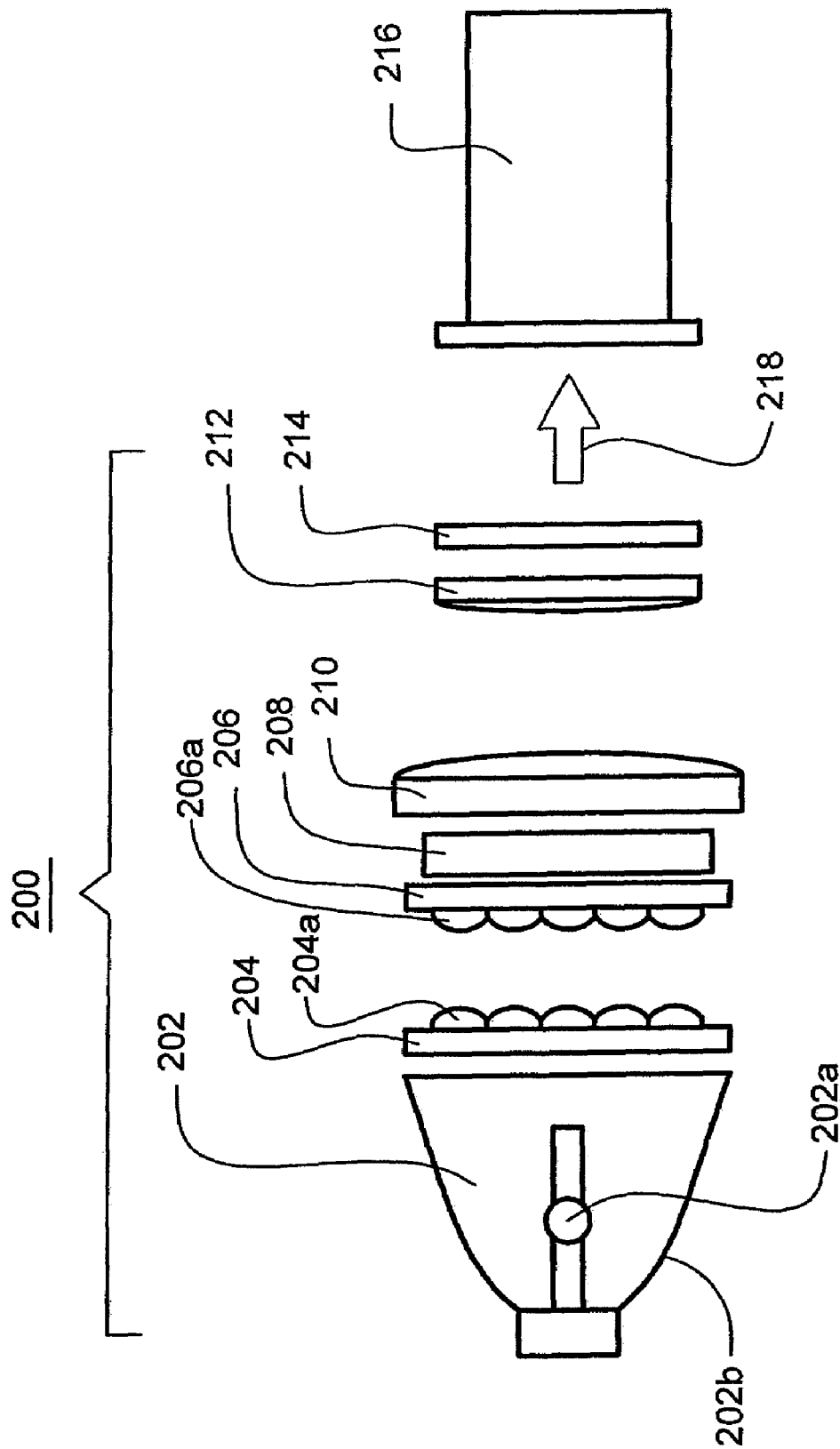

LCD TV AND PROJECTION-BASED BACKLIGHT SYSTEM USED THEREFOR

RELATED APPLICATIONS

The present application is a division of U.S. application Ser. No. 10/813,064, filed Mar. 31, 2004, the disclosure of which is hereby incorporated by reference herein in its entirety.

This application is also related to concurrently filed U.S. Divisional Application titled "LCD TV AND PROJECTION-BASED BACKLIGHT SYSTEM USED THEREFOR" which is also a division of U.S. application Ser. No. 10/813,064, filed Mar. 31, 2004.

BACKGROUND OF THE INVENTION

1. Field of the Invention

This invention generally relates to an LCD TV, and more particularly to an LCD TV using a projection-based backlight system.

2. Description of the Related Art

In recent years, liquid crystal displays (LCDs) have been widely used in a variety of applications, including LCD televisions (LCD TVs), portable computers, and vehicle, ship and aircraft instrumentation, due to the advantage of a thin profile and brilliant display. Most LCDs require an illumination source or backlight unit for backlighting LCD panels so that the image displayed on the LCD can be seen by a viewer.

In those applications, LCD TVs are gradually gaining in popularity due to their thin, light features and low power consumption in comparison with conventional cathode ray tube televisions (CRT TVs). An LCD TV comprises an LCD screen panel and a backlight unit placed at the back of the LCD screen panel and configured to light the LCD screen panel so that an image can be formed on the LCD screen panel. In the backlight unit, cold cathode fluorescent lamps (CCFLs) are generally adopted as the light source to provide a uniform backlighting of the LCD screen panel. It is necessary to illuminate the whole surface of the LCD screen panel with the light from a so-called linear light source by such a fluorescent lamp.

In general, as to features of a cold cathode fluorescent lamp (CCFL) used for a light source in an LCD screen panel, its luminance is inversely proportional to its lifetime. That is, if the CCFL is driven with a high current to increase the luminance, its lifespan is reduced, and if the CCFL is driven at a low current to increase its lifetime, it is difficult to obtain high luminance. However, actual commercial products generally require high luminance and a long lifetime concurrently.

Further, when an LCD TV, particularly over 40 inches, is to be manufactured, it is necessary to have a large backlight unit with more numbers of CCFL tubes for supplying sufficient light to the LCD screen panel of the LCD TV. However, the yield for such a large backlight unit having more numbers of CCFL tubes not only has lower yield rate but also has even higher cost. In additions, a more uniformly bright and effectively polarized light for such an LCD TV is not easy to be achieved by these CCFL tubes.

Due to the above shortcomings of the CCFL and its use in an LCD TV, it is needed to provide an LCD TV using a projection-based backlight system so as to solve the above-mentioned problems in the prior art.

SUMMARY OF THE INVENTION

It is an object of the present invention to provide an LCD TV using a projection-based backlight system which can supply a uniformly bright and effectively polarized light.

It is another object of the present invention to provide a projection-based backlight system which not only has uncomplicated structural design but also has high efficiency polarization.

In order to achieve the above objects, the present invention provides an LCD TV comprises a housing, an LCD screen panel disposed on the front side of the housing, a first mirror disposed on the back side of the housing and a projection-based backlight system disposed in a lower cabinet of the housing, wherein the projection-based backlight system supplies uniformly polarized light to the LCD screen panel through the first mirror. The projection-based backlight system comprises a light source for supplying light, polarizing means for polarizing the light supplied by the light source and a projection lens for receiving the polarized light from the polarizing means and projecting the polarized light to the LCD screen panel.

According to one aspect of the present invention, the polarizing means comprises two lens arrays, a polarization conversion element, a condenser lens, a relay lens and a polarizer. The two lens arrays have a plurality of lenses respectively disposed opposite to each other, adjacent to the light source and configured to receive the light from the light source to compensate the light. The polarization conversion element is disposed adjacent to the lens arrays and configured to convert the compensated light into polarized light. The condenser lens is disposed adjacent to the polarization conversion element and configured to condense the polarized light. The relay lens is disposed adjacent to the condenser lens and configured to direct the condensed light. The polarizer is disposed adjacent to the relay lens and configured to further polarize the directed light. A first projection lens directly receives the polarized light from the polarizer and projects the polarized light to the LCD screen panel. An illuminating light almost like natural color, supplied from the arc lamp, is reflected back by the elliptical reflector and emitted to the lens arrays. When the illuminating light travels through the two lens arrays, the two lens arrays will compensate the illuminating light so that it can be perpendicularly incident on the incident surface of the polarization conversion element. The compensated light passes through the polarization conversion element and is converted into polarized light. The polarized light then passes through the condenser lens and relay lens to reach the polarizer and is further polarized by the polarizer. The light passing through the polarizer becomes polarized light and then enters the projection lens so that a uniformly polarized light can be emitted to the LCD screen panel.

According to another aspect of the present invention, the polarizing means comprises an integrating sphere, a reflective polarizer, an integrating rod, a condenser lens, and a relay lens. The integrating sphere has an entrance aperture and an exit aperture defined thereon. The integrating sphere is disposed adjacent to the light source with the entrance aperture facing the light source and configured to receive the light through the entrance aperture. The reflective polarizer is disposed adjacent to the exit aperture and configured to allow a specific polarization light pass therethrough and to reflect other polarization lights back into the integrating sphere. The integrating rod has an entrance-side end surface and an exit-side end surface. The integrating rod is disposed adjacent to the reflective polarizer and configured to receive the specific polarization light and to direct it out through the exit-side end surface. The condenser lens is disposed adjacent to the exit-side end surface of the integrating rod and configured to condense the specific polarization light. The relay lens is disposed adjacent to the condenser lens and configured to direct the condensed specific polarization light from the condenser lens. The first projection lens receives the specific polarization light from the relay lens and projects the specific polarization light to the LCD screen panel. The integrating sphere and the reflective polarizer are used so that a specific polarization light, e.g. S-polarization light or P-polarization light, can be provided, and others will be reflected back to the integrating sphere and be de-polarized by the integrating sphere. In such a manner, the light can be effectively used and the polarization efficiency can be increased.

According to a further aspect of the present invention, the polarizing means comprises two lens arrays, a condenser lens, a relay lens, a polarizing beam splitter, a second mirror, a half waveplate, and a second projection lens. The two lens arrays have a plurality of lenses respectively disposed opposite to each other, and adjacent to the light source to receive the light from the light source to compensate the light. The condenser lens is disposed adjacent to the lens arrays and configured to condense the compensated light. A relay lens is disposed adjacent to the condenser lens and configured to direct the condensed light. The polarizing beam splitter has a light input side facing the relay lens for receiving the directed light. A first split-light side is adjacent to the light input side, a second split-light side is opposite to the light input side, and a light output side is opposite to the first split-light side. The polarizing beam splitter is configured to split the directed light into first P-polarization light to pass directly through the second split-light side and S-polarization light to be directed toward the first split-light side. The second mirror is disposed adjacent to the first split-light side and configured to reflect the S-polarization light. The half waveplate is disposed adjacent to the second mirror and configured to receive the S-polarization light from the second mirror and to convert the S-polarization light into second P-polarization light. The second projection lens is disposed adjacent to the half waveplate and configured to receive the second P-polarized light from the half waveplate and to project the second P-polarized light to the LCD screen panel. The first projection lens receives the first P-polarized light from the second split-light side of the polarizing beam splitter and projects the first P-polarized light to the LCD screen panel. The second projection lens can be appropriately aligned so as to project the same polarization light as projected by the first projection lens on the same LCD screen panel, so that the light provided by the light source can be effectively used and polarization efficiency can be increased.

BRIEF DESCRIPTION OF THE DRAWINGS

Other objects, advantages, and novel features of the present invention will become more apparent from the following detailed description when taken in conjunction with the accompanying drawings.

FIGS. 1a and 1b respectively shows a front view and a side view of an internal structure of an LCD TV according to an embodiment of the present invention.

FIG. 2 illustrates a structure of a projection-based backlight system according to one embodiment of the present invention.

DETAILED DESCRIPTION OF THE PREFERRED EMBODIMENT

Figure 3:
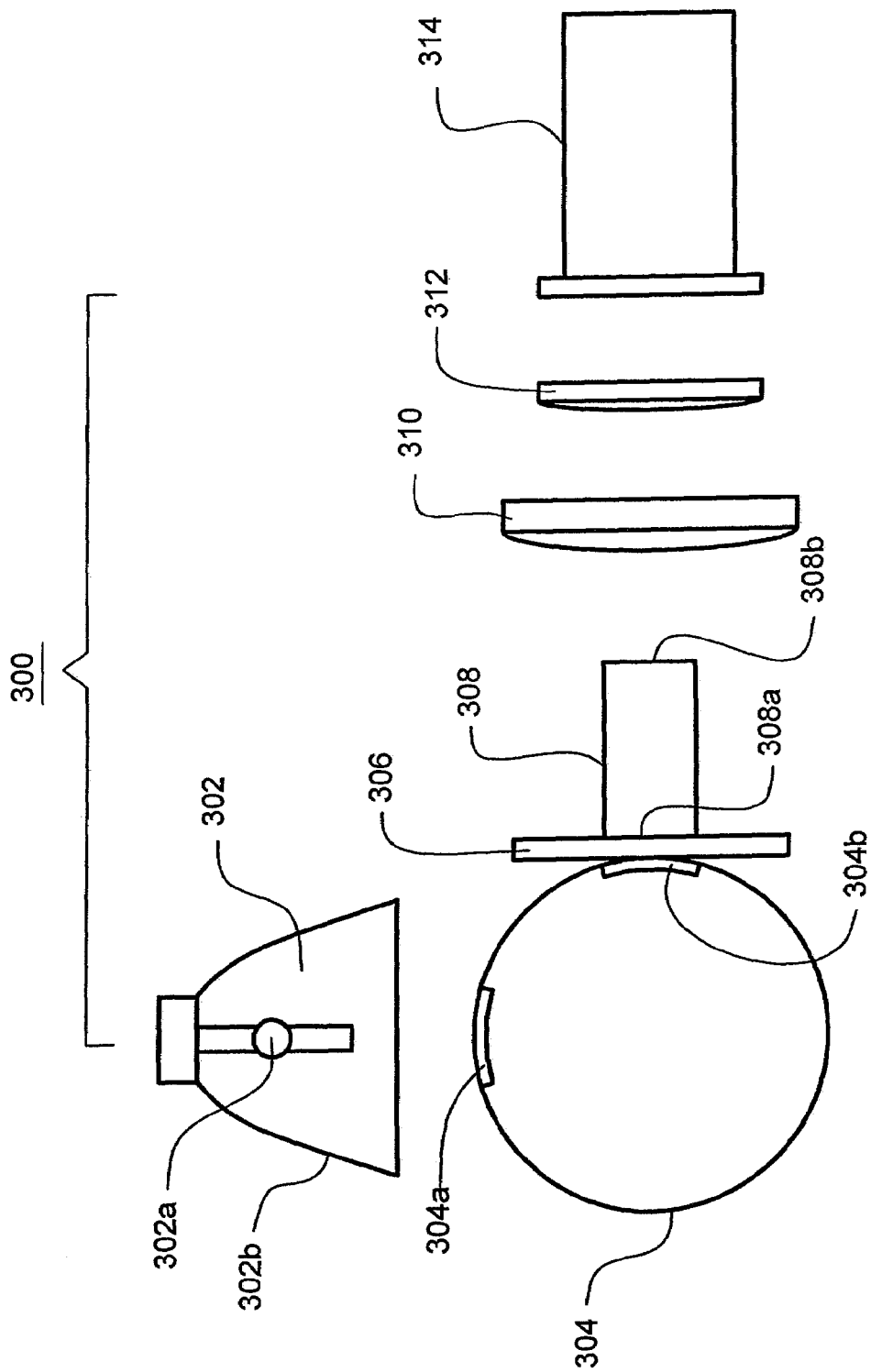
FIG. 3 illustrates a structure of a projection-based backlight system according to another embodiment of the present invention.

FIGS. 1a and 1b respectively show a front view and a side view of an internal structure of a liquid crystal display television (LCD TV) 100 according to an embodiment of the present invention. The LCD TV 100 comprises a housing 102, an LCD screen panel 104, a first mirror 106 and a projection-based backlight system 108. The LCD screen panel 104 is disposed on the front side 102a of the housing 102 and produces an image to a viewer. The first mirror 106 is disposed on the back side 102b of the housing 102. The projection-based backlight system 108 is disposed in a lower cabinet 110 of the housing 102 and is configured to supply uniformly polarized light to the LCD screen panel 104.

When the LCD TV 100 is in "ON" state, the projection-based backlight system 108 emits uniformly polarized light 112 toward the first mirror 106 by a projection lens 108a, and then the first mirror 106 reflects the uniformly polarized light 112 toward the LCD screen panel 104. When the uniformly polarized light 112 reflected from the first mirror 106 reaches the LCD screen panel 104, it will be modulated in accordance with the operation of the pixels of the LCD screen panel 104 which are driven in accordance with corresponding red, green and blue signals derived from a video signal. Finally, the modulated light passes through a color filter (not shown) disposed within the LCD screen panel 104 so as to produce a color image to a viewer. Preferably, a Fresnel lens 114 is disposed at the light incident side 104a of the LCD screen panel 104 for collimating the uniformly polarized light 112 reflected from the first mirror 106.

According to the LCD TV of the present invention, the backlight provided to the LCD screen panel 104 is supplied by the projection-based backlight system 108, not a backlight module with cold cathode fluorescent lights (CCFL), which can not only increase polarization efficiency but also supply more uniform backlight to the LCD screen panel 104. Further, since the LCD screen panel 104 receives a uniformly polarized light supplied by the projection-based backlight system 108, the LCD screen panel 104 can eliminate the usage of polarizer on the surfaces so as to reduce the manufacturing cost of the LCD screen panel. In the following paragraphs, three different structures for forming the projection-based backlight system 108 will be described in greater detail.

FIG. 2 illustrates a structure of a projection-based backlight system 200 according to one embodiment of the present invention. The projection-based backlight system 200 includes a light source 202, two lens arrays 204, 206, a polarization conversion element 208, a condenser lens 210, a relay lens 212, a polarizer 214 and a projection lens 216. The light source 202 further includes an arc lamp 202a and an elliptical reflector 202b. The lens arrays 204 and 206 have a plurality of lenses 204a and 206a respectively and are disposed opposite to each other. Further, they are disposed adjacent to the light source 202 and configured to receive light provided by the light source 202. The polarization conversion element 208 is disposed adjacent to the lens arrays 204 and 206 and converts the light passing therethrough into polarized light. The condenser lens 210 is disposed adjacent to the polarization conversion element 208 and configured to condense the polarized light received from the polarization conversion element 208. The polarization conversion element 208 is preferably a P-S converter. The relay lens 212 is disposed opposite to the condenser lens 210, and configured to receive the condensed light from the condenser lens 210 and to direct it to the polarizer 214. The polarizer 214 is disposed adjacent to the relay lens 212 and configured to polarize light passing therethrough. The projection lens 216 is disposed adjacent to the polarizer 214, and configured to receive the polarized light from the polarizer 214 and to project it to an LCD screen panel (not shown).

In projection-based backlight system 200, an illuminating light almost like natural color, supplied from the arc lamp 202a, is reflected back by the elliptical reflector 202b and emitted to the lens arrays 204. When the illuminating light travels through the two lens arrays 204 and 206, the two lens arrays 204 and 206 will compensate the illuminating light so that it can be perpendicularly incident on the incident surface of the polarization conversion element 208. The compensated light passes through the polarization conversion element 208 and is converted into polarized light. The polarized light then passes through the condenser lens 210 and relay lens 212 to reach the polarizer 214 and is further polarized by the polarizer 214. The light passing through the polarizer 214 becomes polarized light 218 and then enters the projection lens 216 so that a uniformly polarized light can be emitted to an LCD screen panel (not shown).

FIG. 3 illustrates a structure of a projection-based backlight system 300 according to another embodiment of the present invention. The projection-based backlight system 300 includes a light source 302, an integrating sphere 304, a reflective polarizer 306, an integrating rod 308, a condenser lens 310, a relay lens 312 and a projection lens 314. The light source 302 further includes an arc lamp 302a and an elliptical reflector 302b, and the integrating sphere 304 further has an entrance aperture 304a and an exit aperture 304b defined thereon. The integrating sphere 304 is disposed adjacent to the light source 302 with the entrance aperture 304a facing the light source 302. The reflective polarizer 306 is disposed adjacent to the exit aperture 304b of the integrating sphere 304. The integrating rod 308 is disposed at one side of the reflective polarizer 306, opposite to that facing the integrating sphere 304, with its entrance-side end surface 308a aligning with the exit aperture 304b and its exit-side end surface 308b pointing toward the condenser lens 310. The condenser lens 310 is disposed adjacent to the integrating rod 308 and configured to condense the light therethough. The relay lens 312 is disposed opposite to the condenser lens 310, and configured to receive the condensed light from the condenser lens 310 and to direct it to the projection lens 314. The projection lens 314 is disposed adjacent to relay lens 312, and configured to receive the light from the relay lens 312 and to project the light to an LCD screen panel (not shown).

In projection-based backlight system 300, an illuminating light from the arc lamp 302a is reflected back by the elliptical reflector 302b and then enters the inside of the integrating sphere 304. The inner surface of the integrating sphere 304 has a coating of a material with a Lambertian quality; that is, the surface has the directional characteristic of distributing reflected light uniformly over the entire sphere's inner surface. Thus, once the illuminating light enters the integrating sphere 304 through its entrance aperture 304a, the light is evenly distributed over the entire inner sphere surface, including the exit aperture 304b. Since the reflective polarizer 306 is disposed adjacent to the exit aperture 304b, only a specific polarization light, e.g. S-polarization light or P-polarization light, can pass through the reflective polarizer 306 and others will be reflected back into the integrating sphere 304. The specific polarization light then enters the integrating rod 308. The integrating rod 308 is a rod having a rectangular cross section, and is arranged in such a way that the entrance-side end surface 308a is disposed adjacent to the reflective polarizer 306. The specific polarization light passing through the reflective polarizer 306 enters the integrating rod 308 from the entrance-side end surface 308a, and then reaches the exit-side end surface 308b by being totally reflected from the side surfaces of the integrating rod 308. The specific polarization light emitted from the exit-side end surface 308b then passes through the condenser lens 310 and relay lens 312 to reach the projection lens 314 so that the specific polarization light can be emitted to an LCD screen panel (not shown).

According to the projection-based backlight system 300 of the present invention, the integrating sphere 304 and the reflective polarizer 306 are used so that a specific polarization light, e.g. S-polarization light or P-polarization light, can be provided, and others will be reflected back to the integrating sphere 304 and be de-polarized by the integrating sphere 304. In such a manner, the light can be effectively used and the polarization efficiency can be increased.

Figure 4:
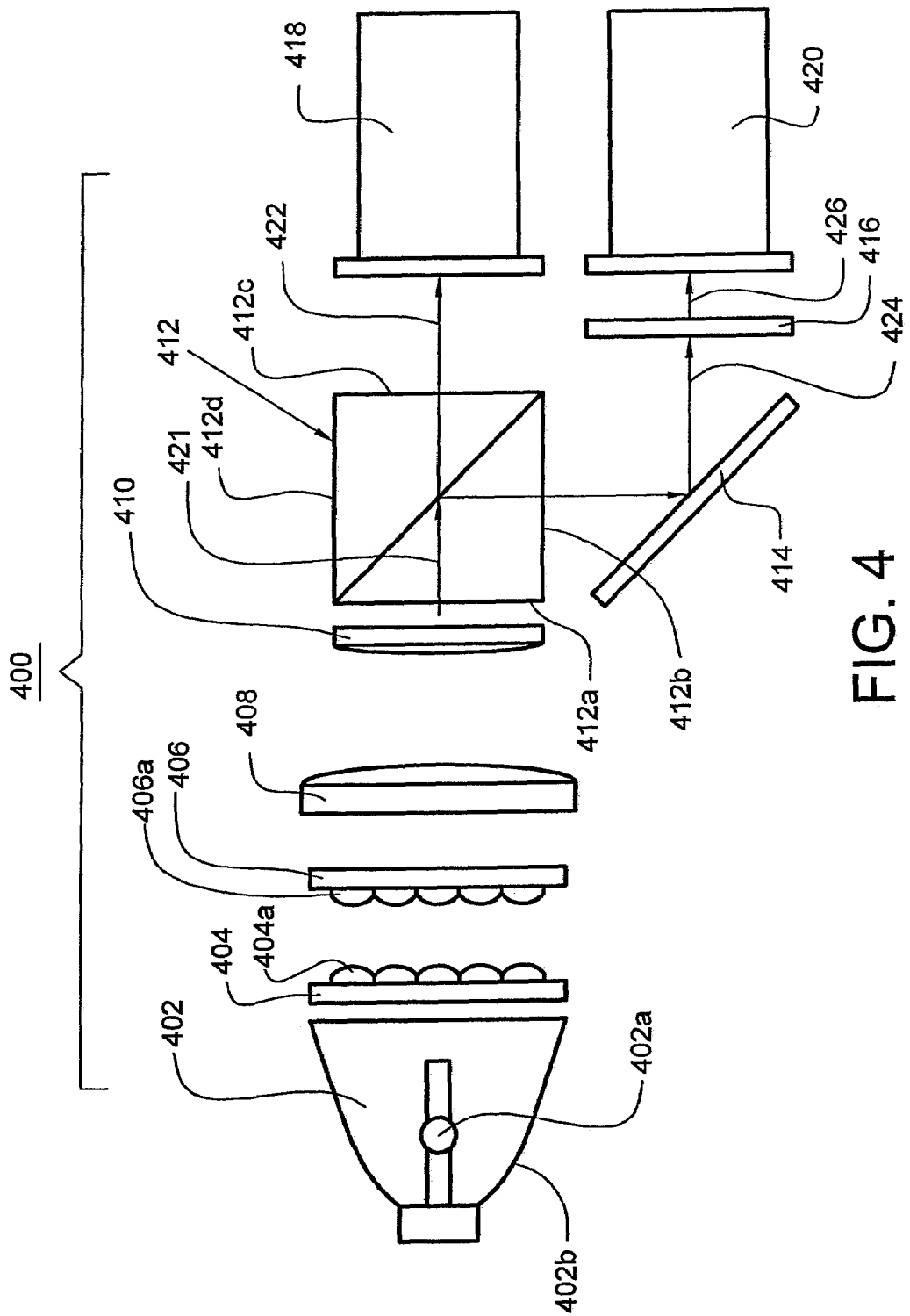
FIG. 4 illustrates a structure of a projection-based backlight system according to another embodiment of the present invention.

FIG. 4 illustrates a structure of a projection-based backlight system 400 according to another embodiment of the present invention. The projection-based backlight system 400 includes a light source 402, two lens arrays 404, 406, a condenser lens 408, a relay lens 410, a polarizing beam splitter 412, a second mirror 414, a half waveplate 416, a first projection lens 418 and a second projection lens 420. The light source 402 further includes an arc lamp 402a and an elliptical reflector 402b. The lens arrays 404 and 406 have a plurality of lenses 404a and 406a respectively and are disposed opposite to each other. Further, they are disposed adjacent to the light source 402 and configured to receive the light provided by the light source 402. The condenser lens 408 is disposed adjacent to the lens arrays 404 and 406 and configured to condense the light received from the lens arrays 404 and 406. The relay lens 410 is disposed opposite to the condenser lens 408, and configured to receive the condensed light from the condenser lens 408 and to direct it to the polarizing beam splitter 412. The polarizing beam splitter 412 is disposed adjacent to the relay lens 410 and configured to reflect S-polarization light in a transverse direction and allow P-polarization light to pass directly therethrough. The polarizing beam splitter 412 has a light input side 412a, a first split-light side 412b adjacent to the light input side 412a, a second split-light side 412c opposite to the light input side 412a and a light output side 412d opposite to the first split-light side 412b. The first projection lens 418 is disposed adjacent to the second split-light side 412c and configured to receive P-polarization light passing through the second split-light side 412c and to project the P-polarization light to an LCD screen panel (not shown). The second mirror 414 is disposed adjacent to the first split-light side 412b and configured to receive S-polarization light passing through the first split-light side 412b and to reflect it toward the half waveplate 416. The half waveplate 416 is disposed adjacent to the second mirror 414 and configured to receive the S-polarization light from the second mirror 414 and to convert it into second P-polarization light. The second projection lens 420 is disposed adjacent to the half waveplate 416 and the first projection lens 418, and configured to receive the second P-Polarization light and to project the second P-Polarization light to the LCD screen panel (not shown).

In projection-based backlight system 400, an illuminating light supplied from the arc lamp 402a is reflected back by the elliptical reflector 402b and emitted to the lens arrays 404. When the illuminating light travels through the two lens arrays 404 and 406, the two lens arrays 404 and 406 will compensate the illuminating light so that it can be perpendicularly incident on the incident surface of the condenser lens 408. The compensated light then passes through the condenser lens 408 and relay lens 410 to reach the polarizing beam splitter 412. When the light 421 enters the polarizing beam splitter 412, it is split by the polarizing beam splitter 412 into first P-polarization light 422 which will pass directly through the second split-light side 412c and S-polarization light 424 which will be directed toward the first split-light side 412b. The first P-polarization light 422 then enters the first projection lens 418 and is emitted to an LCD screen panel (not shown) by the first projection lens 418. In addition, the S-polarization light 424 reaches the second mirror 414 and is reflected toward the half waveplate 416 by the second mirror 414, and then converted into second P-polarization light 426 by the half waveplate 416. The second P-polarization light 426 then enters the second projection lens 420 and is emitted to the same LCD screen panel (not shown) by the second projection lens 420.

According to the projection-based backlight system 400 of the present invention, the second projection lens 420 can be appropriately aligned so as to project the same polarization light as projected by the first projection lens 418 on the same LCD screen panel, so that the light provided by the light source 402 can be effectively used and polarization efficiency can be increased.

While the foregoing descriptions and drawings represent the preferred embodiments of the present invention, it should be understood that various additions, modifications and substitutions may be made therein without departing from the spirit and scope of the principles of the present invention as defined in the accompanying claims. One skilled in the art will appreciate that the invention may be used with many modifications of form, structure, arrangement, elements, and components. The presently disclosed embodiments are therefore to be considered in all respects as illustrative and not restrictive, and the scope of the invention should be defined by the appended claims and their legal equivalents, not limited to the foregoing descriptions.

What is claimed is:

1. A liquid crystal display (LCD) device, comprising:
   a liquid crystal display (LCD) screen panel for producing images; and
   a projection-based backlight system comprising
     a light source for supplying a light beam;
     polarizing means for polarizing the light beam supplied by the light source to obtain a polarized light beam; and
   a first projection lens for enlarging the polarized light beam received from the polarizing means and projecting the enlarged polarized light beam onto the LCD screen panel;
   wherein the polarizing means comprises:
   an integrating sphere having an entrance aperture and an exit aperture defined thereon, the integrating sphere configured to receive the light from the light source through the entrance aperture; and
   a reflective polarizer disposed adjacent to the exit aperture and configured to allow a specific polarization light pass therethrough for the first projection lens and to reflect other polarization lights back into the integrating sphere.

2. The LCD TV as claimed in claim 1, wherein the polarizing means further comprises:
   an integrating rod having an entrance-side end surface and an exit-side end surface, the integrating rod disposed adjacent to the reflective polarizer and configured to receive the specific polarization light through the entrance-side end surface and to direct it out through the exit-side end surface for the first projection lens.

3. The LCD TV as claimed in claim 1, wherein the polarizing means further comprises:
   a condenser lens configured to condense the specific polarization light; and
   a relay lens configured to direct the condensed specific polarization light from the condenser lens for the first projection lens;
   wherein the condenser lens is disposed between the integrating rod and the relay lens.

4. A projection-based backlight system for an LCD TV having an LCD screen panel, comprising:
   a light source for supplying light;
   an integrating sphere having an entrance aperture and an exit aperture defined thereon, the integrating sphere disposed adjacent to the light source with the entrance aperture facing the light source and configured to receive the light through the entrance aperture;
   a reflective polarizer disposed on the exit aperture and configured to allow a specific polarization light pass therethrough and to reflect other polarization lights back into the integrating sphere;
   an integrating rod having an entrance-side end surface and an exit-side end surface, the integrating rod disposed on the reflective polarizer and configured to receive the specific polarization light through the entrance-side end surface and to direct it out through the exit-side end surface;
   a condenser lens disposed adjacent to the exit-side end surface of the integrating rod and configured to condense the specific polarization light;
   a relay lens disposed adjacent to the condenser lens and configured to direct the condensed specific polarization light from the condenser lens; and
   a projection lens disposed adjacent to the relay lens and configured to receive the specific polarization light from the relay lens and to project the specific polarization light to the LCD screen panel.

* * * * *